US008255809B2

(12) United States Patent
Best et al.

(10) Patent No.: US 8,255,809 B2
(45) Date of Patent: Aug. 28, 2012

(54) WEBTOP: MULTIPLE APPLET DELIVERY WITHIN A FIXED-SIZED VIEWING SPACE

(75) Inventors: Timothy A. Best, Rochester, NY (US); Michael J. Dockter, Wellington, FL (US); Stephan Grell, Heilbronn (DE); Ronald W. Lynn, Visalia, CA (US)

(73) Assignee: International Business Machines Corporation, Armonk, NY (US)

( * ) Notice: Subject to any disclaimer, the term of this patent is extended or adjusted under 35 U.S.C. 154(b) by 2313 days.

(21) Appl. No.: 09/747,063

(22) Filed: Dec. 22, 2000

(65) Prior Publication Data

US 2001/0043235 A1 Nov. 22, 2001

Related U.S. Application Data

(60) Provisional application No. 60/172,038, filed on Dec. 23, 1999.

(51) Int. Cl.
*G06F 3/00* (2006.01)
(52) U.S. Cl. .......................... 715/749; 715/739; 715/735
(58) Field of Classification Search .................. 345/749, 345/788, 781, 738, 733, 778; 717/166, 100; 715/749, 804, 808
See application file for complete search history.

(56) References Cited

U.S. PATENT DOCUMENTS

| 5,561,757 | A | * | 10/1996 | Southgate | 345/790 |
| 5,659,694 | A | * | 8/1997 | Bibayam | 345/788 |
| 5,922,044 | A | * | 7/1999 | Banthia | 709/203 |
| 5,929,854 | A | * | 7/1999 | Ross | 345/783 |
| 6,011,537 | A | | 1/2000 | Slotznick | 345/115 |
| 6,175,877 | B1 | * | 1/2001 | Zerber | 719/310 |
| 6,266,056 | B1 | * | 7/2001 | Kanungo | 715/744 |
| 6,351,272 | B1 | * | 2/2002 | Kanungo | 715/764 |
| 6,473,894 | B1 | * | 10/2002 | Shrader et al. | 717/126 |
| 6,513,158 | B1 | * | 1/2003 | Yogaratnam | 717/166 |

FOREIGN PATENT DOCUMENTS

WO  WO 98/43170  * 10/1998

OTHER PUBLICATIONS

"The Swing Tool Set" article. Sun Microsystems Inc., Feb. 1998: 10. [Online] Available http://www.cs.bris.ac.uk/~worrall/tool_set.html Jul. 21, 2003.*

Flanagan, David. Java in a Nutshell. O'Reilly & Associates, Inc. 1996, pp. 211-213.*

MSDN Online Web Workshop—DHTML, HTML & CSS Home http://msdn.microsoft.com/workshop/author/default.asp.

(Continued)

*Primary Examiner* — Namitha Pillai
(74) *Attorney, Agent, or Firm* — Sughrue Mion, PLLC (57) ABSTRACT

A technique for executing applets is provided. Initially, a webtop applet is loaded into, for example, a browser window. The webtop applet displays the list of applets available to a user. The user selects one or more applets from the list received by the webtop applet. The webtop applet generates a separate JInternal frame for each selected applet, and each JInternal frame executes its associated applet within a separate window. The windows assume different configurations such as being resized, repositioned, cascaded, tiled, windowed, minimized, maximized, or overlapped with one or more other windows within a fixed-size view space of the browser window. Each window is manipulated by the user separately from the other windows which are contained within the fixed sized view space.

4 Claims, 6 Drawing Sheets

OTHER PUBLICATIONS

Web Style Sheets, http://www.w3.org/Style/, p. 1-11.
Yahoo! Business and Economy>Shopping and Services>Communication and Information Management . . . , http://dir.yahoo.com/Business_and_Exonomy/Shopping_and_Services/Communi . . . /Web_Based_Desktops, p. 1-2.
Bungo, http://ww3.bungo.com/bungo.com/start.taf.
d-Page.com. http://d-page.com/web/.
d-Page.com, http://d-page.com/web/news/ns_1.html.
Damango, http://www.damango.com/index2.html.
DeskDemon.com: Home Page, http://deskdemon.com/.
DeskDemon.com: About Us, http://deskdemon.com/local/aboutus.html, p. 1-11.
Welcome to Desktop.com!, http://www.desktop.,com/.
Desktop.com Solutions. http://www.desktop.com/e/show/solutions/solutions.dtml, p. 1-2.
E-OMNINET, http://eo.yifan.net/.
Enfish, http://www.enfish.com/.
Enfish company enfish corporate facts, http://www.enfish.com/ompany/factsheet.asp, p. 1-3.
FreeDesk.com: Remote PC Access, Instant Internet PC Network, Web-based Office Suite, htp://www.freedesk.com/, p. 1 of 1.
Welcome—MyFree Desk—Our Product, http://www.dreedesk.com/prod.html, p. 1 of 1.
Blox.com, http://www.blox.com/, p. 1 of 1.
Blox.com/What is Blox.com?, http://www.blox.om/corp., p. 1-5.
Launchpad.com, http://www.launchpad.com/, p. 1 of 1.
LinkUall.com—Smart organization for online communities, http://www.kubjyakk.cin/, p. 1 of 1.
Magicaldesk 2.5, http://www.magicdesk.com/redir_faclift2.5/login.asp?Referrer=, p. 1 of 1.
MID—Your life on the web; http://www.myinternetdesktop.com/, p. 1 of 1.
MID—Your life on the web, http://www.myinternetdesktop.com/company/index.cfm.
MID—Your life on the web; http://www.myinternetdesktop.com/company/index.cfm.
www.opendesk.com; http://opendesk.com/od/AppWrapper.pm.
Personable.com—Application Service Provider; http://www.personable.com/.
StoragePoint, Inc.; http://www.storagepoint.com/.
Theedesk.com—Email, Calendar, Contact List, Ecards and much more; http://www.theedesk.com/.
TraffickFavorites; http://www.traffickfavorites.com/html/default.asp.
Log in to Visto.com; http://www4.visto.com/login.html?
WorkSpot, Inc.; http://www.workspot.com/.
Zkey: Home Page; http://www.zkey.com/.

* cited by examiner

WEBTOP: MULTIPLE APPLET DELIVERY WITHIN A FIXED-SIZED VIEWING SPACE

PROVISIONAL APPLICATION

This application claims the benefit of U.S. Provisional Application No. 60/172,038 entitled, "WEBTOP: MULTIPLE APPLET DELIVERY WITHIN A FIXED-SIZED VIEWING SPACE," filed Dec. 23, 1999, by Timothy A. Best, which is incorporated by reference herein.

BACKGROUND OF THE INVENTION

1. Field of the Invention

This invention relates in general to computer systems, and in particular, to providing multiple applet delivery within a fixed-size viewing space.

2. Description of Related Art

Years ago, computer video displays were able to show only one application at a time. When an application ran, it had control of the entire video display. Hence, two applications could not occupy the same visual space. This was not a limitation of the application; it was a limitation of the underlying subsystem. Examples include DOS 3.1, VM and MVS consoles.

This was not seen as a problem with computers, but a problem with human-computer interaction. Human beings are capable of "multi-processing" applications at a computer terminal. Having only one application available at a time was a severe impediment. In retrospect, it is difficult to believe that computer professionals worked in an environment with such limitations in the early 1980's.

To improve this situation, "windowing" each application was introduced into operating system shells. The technique involves providing an independent frame for each activity on the computer desktop. This allowed the fixed-size space of a computer terminal to display multiple applications running concurrently. Furthermore, concepts such as overlapping, resizing, cascading, minimizing, and maximizing were introduced to allow a user to balance his/her visual space. Examples include: X-Windows, Apple System-7, and Microsoft Windows.

Evolution of the computer industry has lead to an amazing growth of the Internet. The Internet is a collection of computer networks that exchange information via Transmission Control Protocol/Internet Protocol ("TCP/IP"). The Internet computer network consists of many internet networks, each of which is a single network that uses the TCP/IP protocol suite. Currently, the use of the Internet computer network for commercial and non-commercial uses is exploding. Via its networks, the Internet computer network enables many users in different locations to access information stored in data sources (e.g., databases) stored in different locations.

The World Wide Web (i.e., the "WWW" or the "Web") is a hypertext information and communication system used on the Internet computer network with data communications operating according to a client/server model. Typically, a Web client computer will request data stored in data sources from a Web server computer, at which Web server software resides. The Web server software interacts with an interface connected to, for example, a Database Management System ("DBMS"), which is connected to the data sources. These computer programs residing at the Web server computer will retrieve the data and transmit the data to the client computer. The data can be any type of information, including database data, static data, HTML data, or dynamically generated data.

With the fast growing popularity of the Internet and the World Wide Web (also known as "WWW" or the "Web"), there is also a fast growing demand for Web access to databases. In particular, databases on the Web are often used to store images, and image browsing plays an important part in daily Internet activity. In data processing, there exist different image file formats for various application domains. However, since conventional browsers (or Web browsers) accommodate a limited number of image viewers, they can only handle some of the most popular image file formats, such as GIF, JPEG, etc. An advanced multimedia database, however, may contain certain images that cannot be viewed by a conventional browser. This inability may impact the deployment of Web-based applications.

The computer world has been revolutionalized by content delivery through Hyper Text Markup Language (HTML) documents. HTML is used to create documents on the Web. In particular, HTML defines the structure and layout of a Web document by using a variety of tags and attributes. The correct structure for an HTML document is as follows:

<HTML><HEAD>(information about what the document is about)</HEAD><BODY> (tags and attributes that define a Web page) </BODY></HTML>.

Browsers, such as Netscape's Navigator and Microsoft's Internet Explorer, have allowed users to view documents on the Web.

Since the inception of the browser and HTML, Java applets have arrived. Java applets are small programs which can be "embedded" into Web pages. That is, applets are programs that are designed to be executed from within other applications. These programs can range from applets which are used for clever display techniques to applets which interact with the human user. Browsers that are equipped with Java virtual machines can interpret applets from Web servers.

The original problem of "one application per fixed-sized viewing space" has returned. Two applets cannot occupy the same space on a webpage; they cannot be repositioned, minimized, maximized, overlapped, or resized.

Some conventional techniques have attempted to solve this problem, however, each of these techniques has limitations. The conventional techniques are: HTML Frames, IFRAMES (a.k.a. "Floating Frames"), and simply opening a new browser window.

HTML frames are described in HTML documents and are used to divide browser windows into two or more document windows. Each HTML Frame may display different documents or may display different parts of the same document. An HTML Frame in an HTML document can cause a web page to appear to be divided into multiple, scrollable windows. Each HTML Frame has a name, a source document locator (i.e., the address of the document to be displayed in the frame), dimensions, border alignment and decorations, scroll and resize behaviors, loading and unloading behavior, file and topic maps, and style sheets. The limitations of frames are that each "window" must have the same relative position to other windows. Thus, they cannot overlap, be minimized, or be maximized.

An IFRAME element is very similar to an HTML FRAME element. An IFRAME is designed to be used in the body of an HTML document, and it defines a frame which takes place in the document flow. An IFRAME can be targeted and navigated independent of the parent document. The IFRAME element is a container. An IFRAME has several attributes, including, but not limited to, a name, a source document locator (i.e., the address of the document to be displayed in the frame), borders (for a border for the frame), margin width and height, scrolling (specifies whether the frame should have scrollbars), width and height of the inline frame, and align (specifies how the frame is positioned relative to the current text line in which it occurs). An IFRAME does not have the attribute NORESIZE; an inline frame is not resizable. An IFRAME enables insertion of HTML documents into other HTML documents. The limitations of iFrames are that they behave similar to a <IMG> tag. More specifically, they have no means for being repositioned within the fixed-size viewing space, cannot overlap, be minimized, or be maximized.

An explanation of "opening a new browser window" is simply starting another copy of the browser with the particular applet in the browser. The limitation of this is that it doesn't address the problem of a fixed-sized viewing space. These windows are not contained within a space defined by a web page.

There is a need in the art for an improved technique for enabling multiple applets to occupy the same space on a webpage.

SUMMARY OF THE INVENTION

To overcome the limitations in the prior art described above, and to overcome other limitations that will become apparent upon reading and understanding the present specification, the present invention discloses a method, apparatus, and article of manufacture for a technique for delivering multiple applets within a fixed-sized viewing space.

According to an embodiment of the invention, one or more applets selected by a user are received. Separate windows for each selected applet are generated. Then, each applet is executed in a separate window.

BRIEF DESCRIPTION OF THE DRAWINGS

Referring now to the drawings in which like reference numbers represent corresponding parts throughout.

DETAILED DESCRIPTION

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Hardware Architecture

Figure 1:
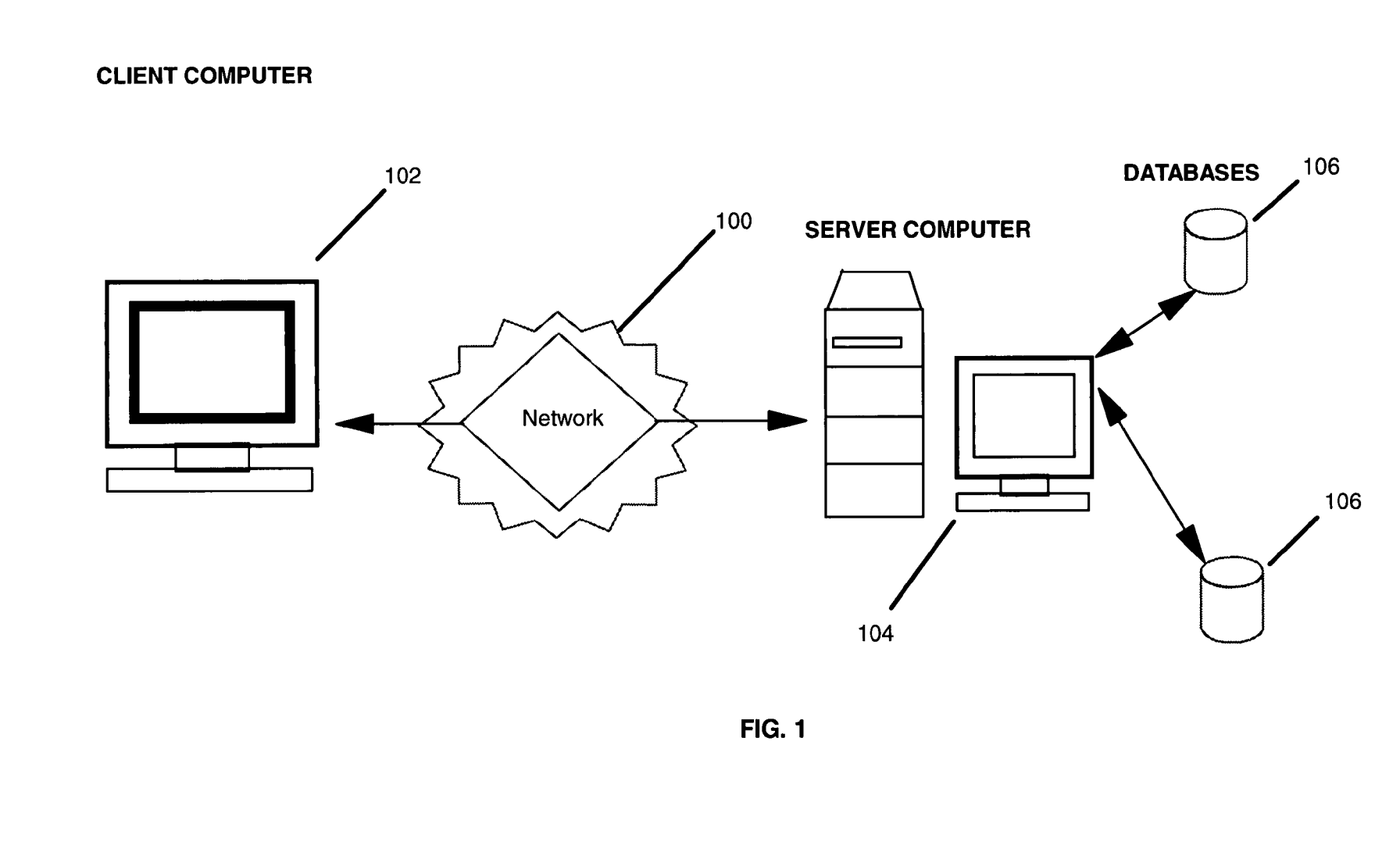
FIG. 1 is a schematic that illustrates the hardware environment of an embodiment of the present invention.

FIG. 1 is a schematic that illustrates the hardware environment of an embodiment of the present invention, and more particularly, illustrates a typical distributed computer system using a network 100 to connect a client computer 102 executing client applications to a server computer 104 executing server software and other computer programs, and to connect the server system 104 to data sources 106. A data source 106 stores data, such as HTML documents with embedded applets. A typical combination of resources may include a client computer 102 that is a personal computer or workstation, and a server computer 104 that is a personal computer, workstation, minicomputer, or mainframe. These systems are coupled to one another by various networks, including, but not limited to, LANs, WANs, SNA networks, and the Internet. The client computer 102 and the server computer 104 additionally comprise an operating system and one or more computer programs.

A client computer 102 typically executes a client application and is coupled to a server computer 104 executing one or more server software programs. The client application may be a computer program such as a browser. The server computer 104 also uses a data source interface and, possibly, other computer programs, for connecting to the data sources 106. The client computer 102 is bi-directionally coupled with the server computer 104 over a line or via a wireless system. In turn, the server computer 104 is bi-directionally coupled with data sources 106. The data sources 106 may be geographically distributed.

The operating system and computer programs are comprised of instructions which, when read and executed by the client and server computers 102 and 104, cause the client and server computers 102 and 104 to perform the steps necessary to implement and/or use the present invention. Generally, the operating system and computer programs are tangibly embodied in and/or readable from a device, carrier, or media, such as memory, other data storage devices, and/or data communications devices. Under control of the operating system, the computer programs may be loaded from memory, other data storage devices and/or data communications devices into the memory of the computer for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize that many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

WebTop: Multiple Applet Delivery within a Fixed-Sized Viewing Space

The embodiment of the current invention allows manipulation of multiple applets within a fixed-size viewing space within a browser. The types of manipulation include, but are not limited to, minimizing, maximizing, resizing, repositioning, re-ordering, tiling, and cascading the multiple applets. The invention provides a webtop applet that hosts other (e.g., a user's) applets. The user's applets are not changed.

As currently defined by HTML standards, an applet is given a position on an HTML page and can specify the dimensions of the window in which it will appear. Note that the WIDTH and HEIGHT parameters below are static, thus, in a conventional system, the window in which the applet appears cannot be resized.

Applet embedding example #1. The following is an example of an applet that is embedded in a web page.

```
APPLET                                    // beginning of applet
   CODE="sevenAMNewsTicker.class"         //
   CODEBASE="http://www.7am.com/java"     //location of 7am program
   WIDTH=400                              //fixed width
   HEIGHT=50>                             //fixed height
   <PARAM NAME="channels" VALUE="+        // parameters into the 7am
   WORLDnews +USAnetnews                  // program
   +WORLDnetnews+USAnews ">
</APPLET>                                 // end of applet
```

Applet embedding example #2. The following is an example of an applet embedded in a web page using a Microsoft programming technique. Again, the width and height of the applet window are fixed and cannot be resized, overlapped, etc. in a conventional system.

```
<OBJECT classid="clsid.8AD9C840 - 044E - 11D1 - B3E9 -
00805F499D93"
      WIDTH = 300                         // fixed width
      HEIGHT = 100                        // fixed height
      codebase=http://java.sun.com/products/plugin/1.2.2/
         jinstall-1_2_2-win.cab#Version=1, 2, 2, 0">
   <PARAM NAME = CODE VALUE =              //parameters
   "MyApplet.class">
   <PARAM NAME="type" VALUE="application/x - java -
   applet; version=1.1">
   <COMMENT>
   <EMBED type-"application/x - java - applet;   //points to applet
   version=1.1"
      java_CODE = "MyApplet.class"
      WIDTH = 300                         // fixed width
      HEIGHT = 100                        // fixed height
      pluginspage="http://java.sun.com/
      products/plugin/1.2.2/plugin - install.html">
   <NOEMBED>
   </COMMENT>
   </NOEMBED>
   </EMBED>
</OBJECT>
```

One embodiment of the invention solves the problem of "one applet per fixed-sized viewing space" by applying techniques of windowing applets within a fixed-size viewing space on a webpage. This allows a computer user who is using a browser to "multi-task" applets. Again, concepts such as overlapping, resizing, cascading, minimizing, and maximizing can be used to allow a user to balance visual space.

The "flash of inspiration" in this invention is the use of a Java class for a purpose other than it's intended purpose. Technically, the invention is JApplets which contain JinternalFrames where each JinternalFrame contains a JApplet—almost recursive in nature. The original purpose of the JinternalFrame was to allow JApplets to have a multiple-document interface (known as "MDI", in Microsoft-speak) in which one applet would have multiple documents visable. An analogy would be Microsoft Word having multiple text files on the screen simultaneously. JinternalFrames were not intended to have multiple-applets visable. This can be proven by the lack of native support for such operations such as missing init( ) calls for JApplets within a JInternalFrame. One aspect of the invention is the extrapolation from a JinternalFrame holding a "document" to a JInternalFrame holding a JApplet. It is further an aspect of the invention that this creates a windowing desktop within a browser, a "WebTop".

The current form of the "WebTop" is a Java applet which can be included within the <body></body> tags of any HTML document. It can also be configured to be a Java application.

The following is an illustration of WebTop inclusion in an HTML document. It would be found somewhere within the <body></body> tags in the HTML document. It is invoked as a standard applet.

```
<object classid=
"clsid : 8AD9C840 - 044E - 11D1 - B3E9 - 00805F499D93"
   codebase="http://java.sun.com/products/plugin/1.1.1./jinstall - 111 -
   win32.cab#Version=1,1,1,0"
   align="baseline" border="0" width="99%" height="92%">
   <param name="CODE" value="WebTop.class">
   <param name="type" value=
   "application/x - java - applet; version=1.1">
   <COMMENT>
      <embed align="baseline" border="0" width="99%" height="92%"
         //incorporate WebTop into web page space
         type="application/x - java - applet; version=1.1">
         java_code="WebTop.class"
         pluginspage=
         "http://java.sun.com/products/plugin/1.1.1/plugin - install.html">
   <NOEMBED>
   </COMMENT>
   </NOEMBED>
</object>
```

Figure 2:
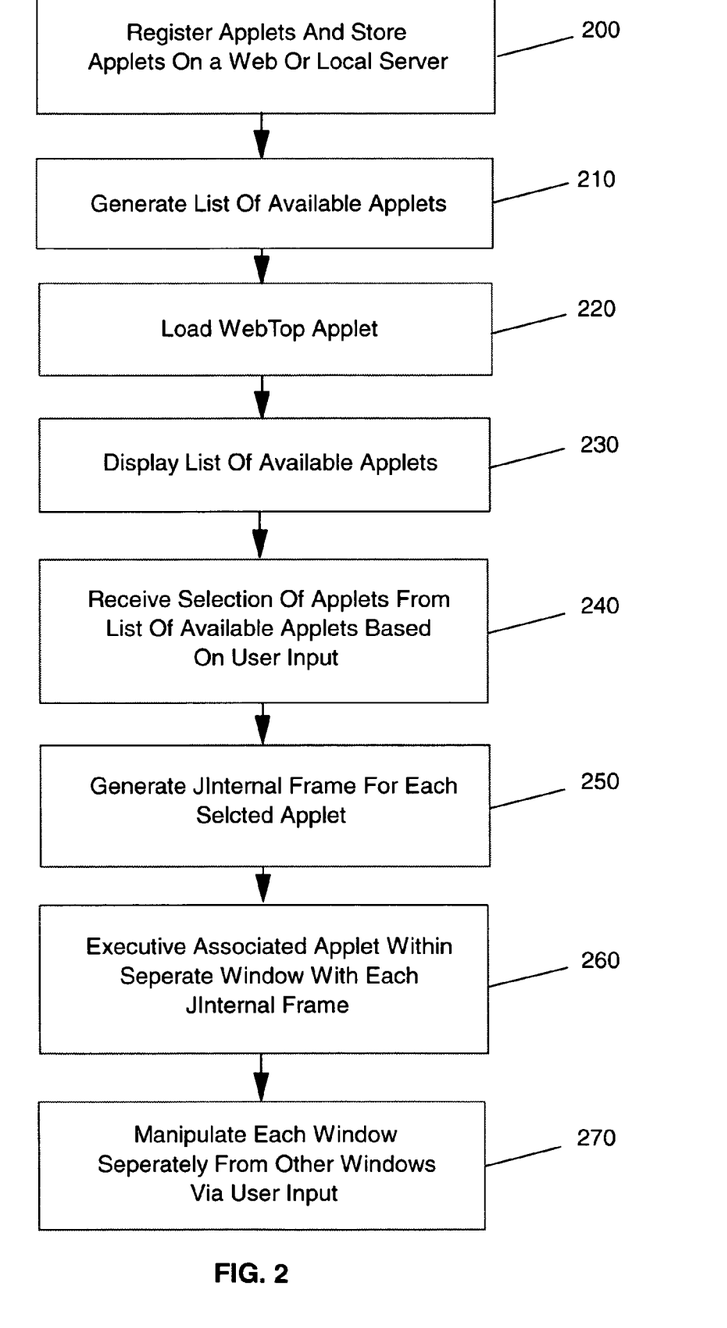
FIG. 2 is a flow diagram showing general processing for use of one embodiment of the invention.

FIG. 2 is a flow diagram showing general processing for use of one embodiment of the invention.

Initially, in block 200, a system administrator registers applets and stores these on a web server or a local server.

Continuing with block 210, a list of available applets is generated from the registered applets. For example, a WebTop applet may be executed to display a list of available applets from which users can select from the displayed applets.

In block 220, the WebTop applet is loaded into, for example, a browser window. In an alternative embodiment of the present invention, a Java application rather than a browser window can be utilized. More specifically, a Java application can be launched from the desk top, and the WebTop applet can be executed without the requirement of a browser window.

Then, in block 230, the WebTop applet displays the list of available applets.

Then, in block 240, a user selects one or more applets from the list that is received by the WebTop applet. The selected applets may be different applets. In an alternative embodiment, the same applet may be selected multiple times.

In block 250, the WebTop applet generates a separate JInternal frame for each selected applet.

Then, in block 260, each JInternal frame executes its associated applet within its own window, i.e., within a separate window. The window may be resized, repositioned, minimized, maximized, overlapping with one or more other windows, or arranged in various other configurations including, but not limited to, cascaded and tiled applets.

Continuing with block 270, each window is manipulated by a user via user input separately from the other windows which are contained within the fixed sized view space. This processing is illustrated and further explained with reference to FIGS. 3-6.

Figure 3:
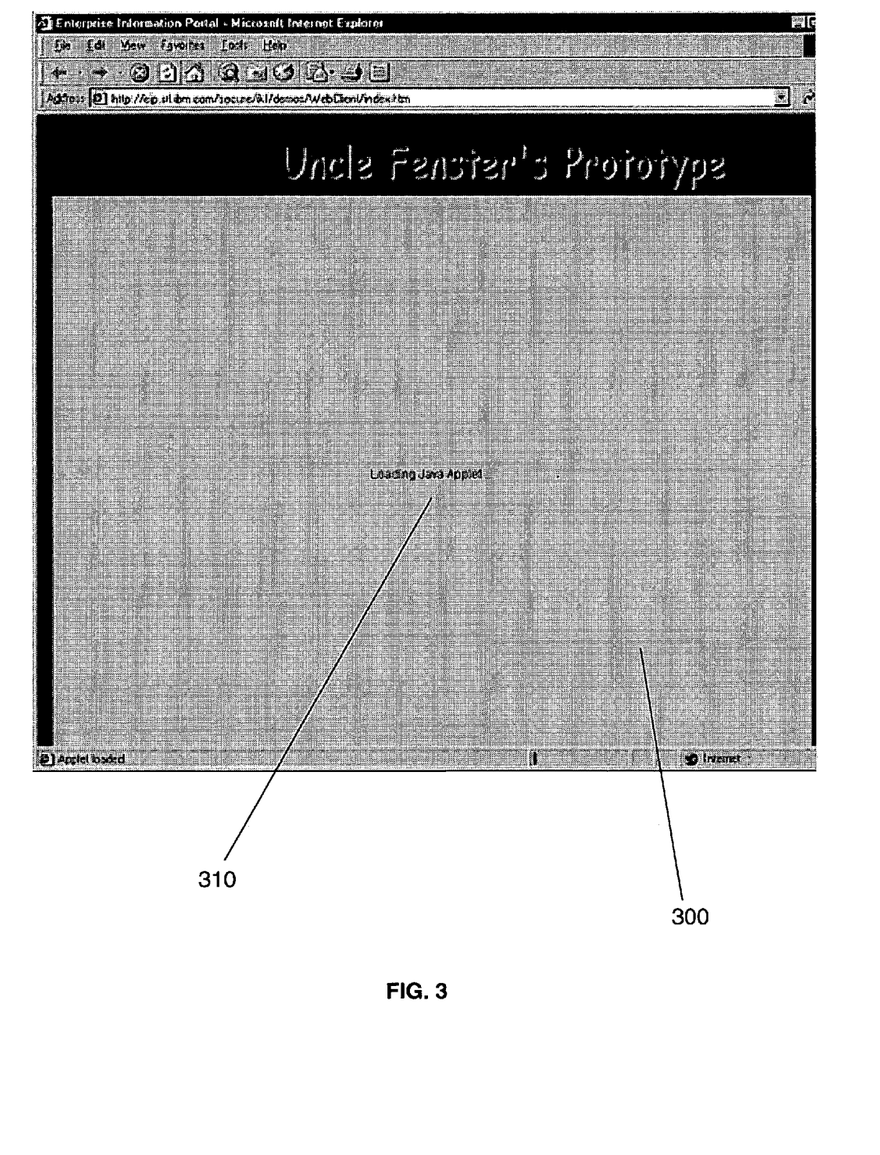
FIG. 3 is a diagram illustrating a gray box which is the fixed-size viewing area that the WebTop applet will occupy.

FIG. 3 is a diagram illustrating the area that the WebTop applet occupies. Specifically, the gray view space 300 is the fixed-size viewing area that the WebTop applet occupies as indicated by the "Loading Java Applet" indicator 310. The WebTop applet may host one or more windows within the gray view space 300 as further illustrated in FIGS. 4 and 5.

Figure 4:
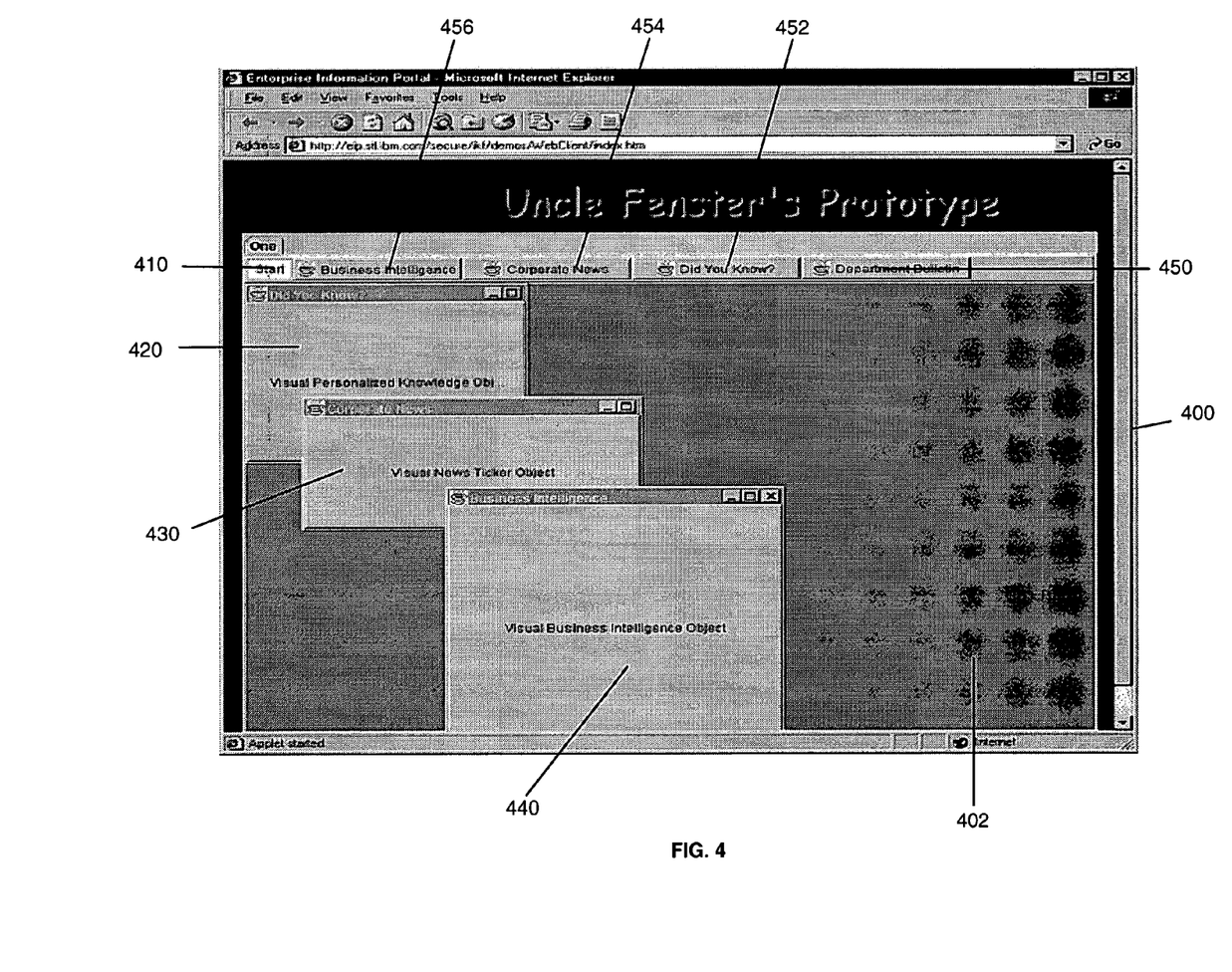
FIG. 4 illustrates a web page when the WebTop applet loads.

FIG. 4 is an illustration of a web page when the WebTop applet loads. Specifically, the browser screen 400 includes fixed-size view space 402. Applets may assume an initial configuration within view space 402. For example, by selecting "Start" 410, a list of applets available to the user appears in an initial configuration as illustrated in FIG. 4. One initial configuration may include three applets 420, 430, and 440 in a cascade pattern from the upper left corner of the view space 402 towards the lower center of the view space 402. More specifically, applets "Did You Know?" 420, "Corporate News" 430, and "Business Intelligence" 440 may be cascaded. Those skilled in the art will recognize that various other initial arrangements may be selected by a user to allow for user customization.

In addition, applets available to a user may be presented in a toolbar 450. If a window is initially minimized, and an applet is selected from a toolbar 450, then the applet is restored to the foreground. Similarly, if a window is initially in the background, and an applet is selected from a toolbar 450, then the applet is also restored to the foreground. Within this general framework, for example, if the "Did You Know" toolbar segment 452 is selected from toolbar 450, then the "Did You Know" applet 420 may be presented in the foreground in a first window. Selecting the "Corporate News" toolbar segment 454 from the toolbar 450 may place the "Corporate News" applet 430 in the foreground into a second window which may overlap or cascade the "Did You Know" applet 420. Similarly, if the "Business Intelligence" toolbar segment 456 is selected from the toolbar 450, then the "Business Intelligence" applet 440 can be placed within the foreground. Indeed, those skilled in the art will recognize that applets 420, 430, and 440, and any additional applets as necessary, may be selected from a toolbar 450 and arranged in various configurations within the fixed-size viewing space 402 of browser 400. Examples of some of the possible configurations are illustrated in FIG. 5.

Figure 5:
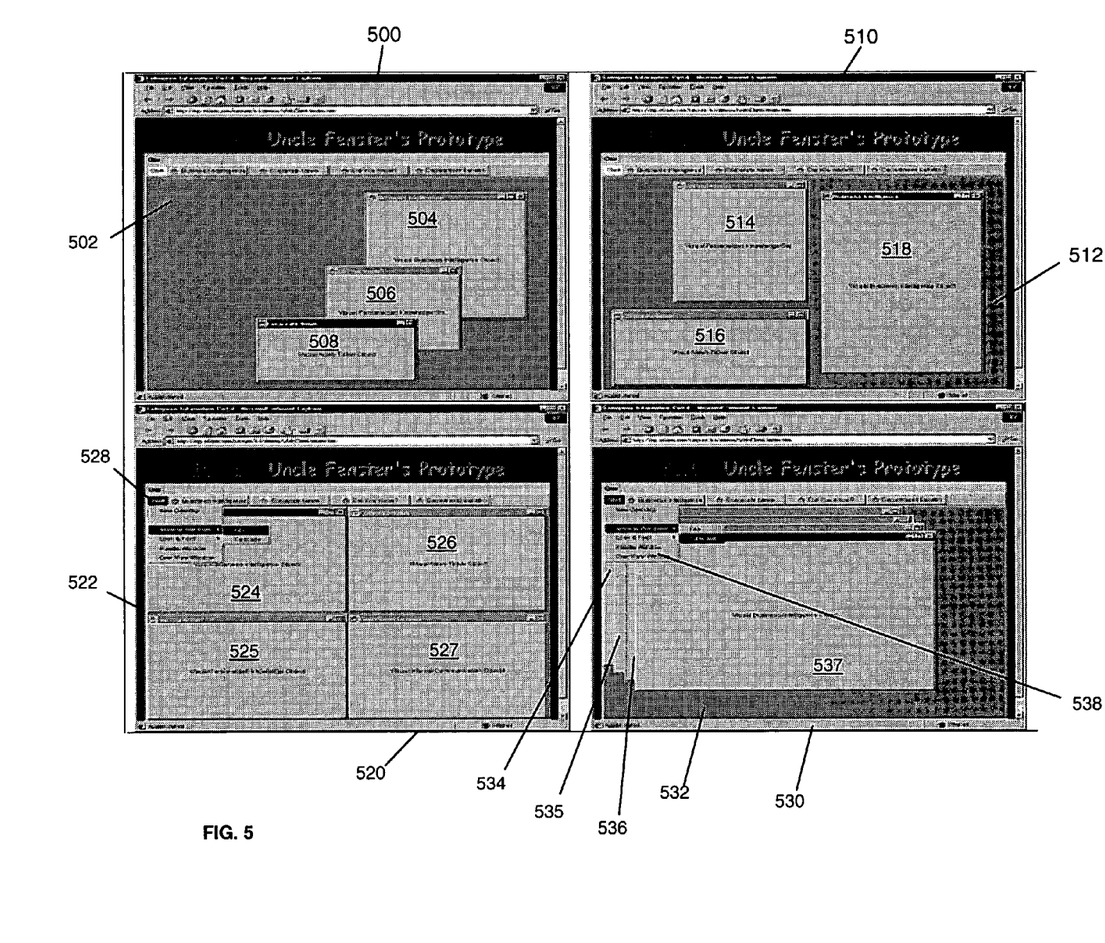
FIG. 5 illustrates the manner in which applets of internal frames of the WebTop can be repositioned, resized, tiled, and cascaded.

FIG. 5 illustrates various possible configurations that applets may assume within the fixed-size viewing space. As illustrated in FIG. 5, the WebTop's internal frames containing applets can be repositioned, resized, tiled, and cascaded.

More specifically, with reference to browser screen 500 and within fixed-size view space 502, applets 504, 506 and 508 may be arranged in various cascade arrangements. For example, FIG. 5 illustrates a cascade arrangement from the top right corner to the bottom center of fixed-size view space 502. Of course, other cascade arrangements are possible besides those arrangements previously illustrated in FIG. 5. For example, the cascade arrangement may be more extended horizontally instead of spanning most or all of the vertical space of the view space 502 or be arranged in different directions.

Additionally, as illustrated in browser screen 510, the fixed-size view space 512 may include applets arranged independently of each other. For example, applets 514, 516 and 518 may all appear as independent screens within view space 512. Additionally, if applets 514, 516, and 518 assume an initial size, order, and/or position, applets 514, 516, and 518 may be repositioned, reordered and/or resized to satisfy the user's needs.

Browser screen 520 illustrates that the fixed-size view space 522 may be filled with a tiled arrangement of applets 524, 525, 526, and 527. Fixed-size view space 522 is illustrated to be filled in by applets 524, 525, 526, and 527 by a bracket since no visible part of the fixed-size view space 522 appears. However, those skilled in the art will recognize that the fixed-size view space 522 may be filled with fewer applets in a tiled arrangement or more applets in a tiled arrangement. Additionally, those skilled in the art will recognize that the tiled arrangement of applets may partially fill the view space. Applets may be repositioned and resized as previously described. In addition, applets may be presented in the foreground by selecting them from a toolbar 528.

Browser screen 530 illustrates that fixed-size view space 532 may be filled with a cascaded arrangement of applets 534, 535, 536, and 537. Of course, cascaded windowing may be implemented with additional or fewer applets, and applets 534, 535, 536, and 537 may be cascaded in arrangements besides the illustrated arrangement based from the upper left corner of view space 532. In addition, applets may be presented in the foreground by selecting them from a toolbar 538.

Thus, a browser user can utilize applets in various configurations by resizing, repositioning, overlapping, cascading, tiling, and/or windowing applets to optimize for his or her requirements without changing the size of the viewing area within the browser screen. Further, although FIG. 5 illustrates individual applets that consume portions of the view space, applets may be maximized such that it consumes the entire view space or minimized such that they are not visible within the background, or are represented within a toolbar. Additionally, applet configuration may be selected by a user from, for example, a "Start" menu and/or a toolbar.

Figure 6:
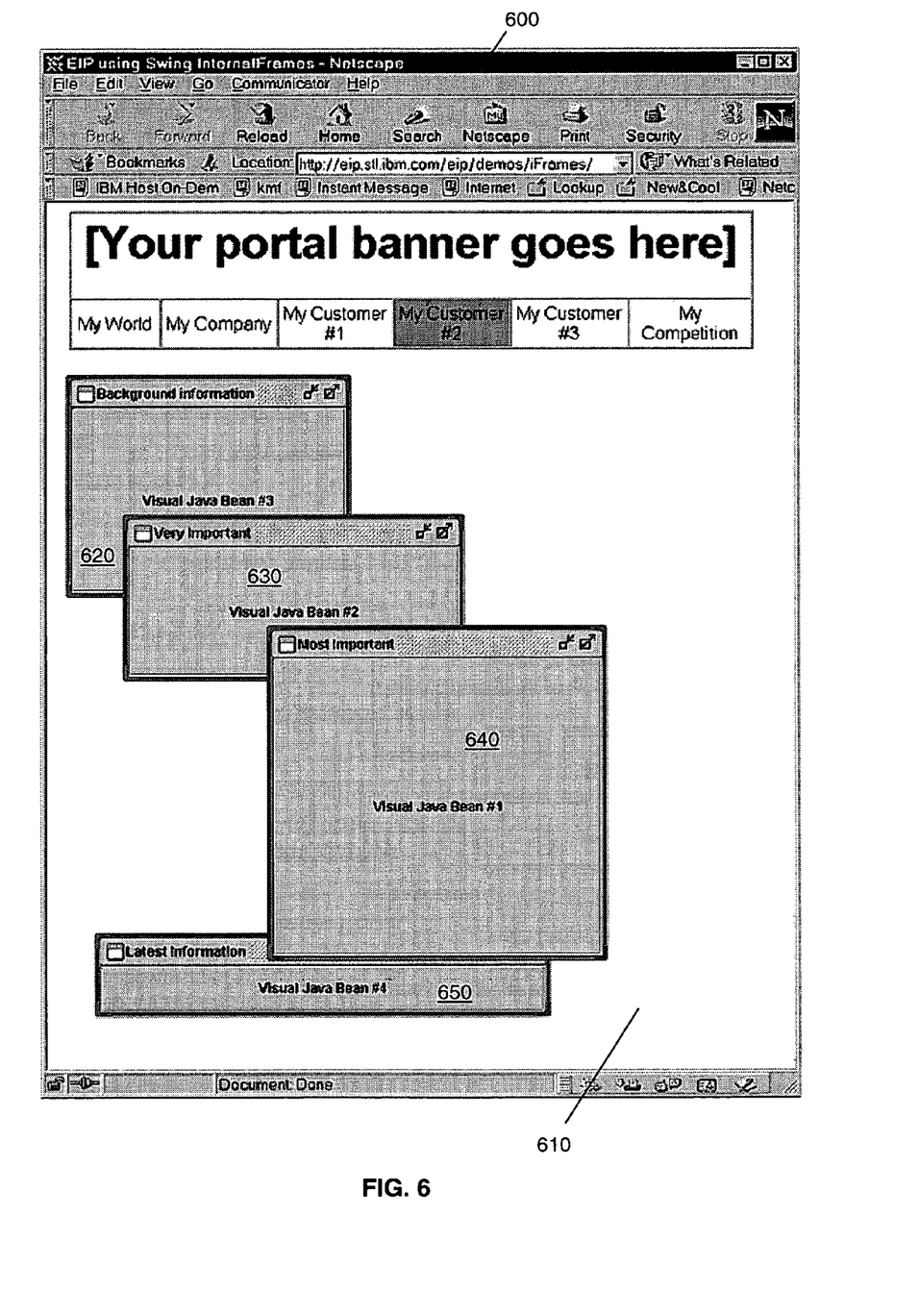
FIG. 6 illustrates an alternative depiction of the ordering of applet windows in a screen.

FIG. 6 illustrates an alternative depiction of the ordering of applet windows in a screen. In one embodiment, the invention works in conjunction with the IBM Enterprise Information Portal. The intent is to bring together various applets to be used on what are called a "Portal" webpages. Initially the applets will come from IBM's Content Management, Business Intelligence and Knowledge Management areas.

As shown in FIG. 6, browser screen 600 of IBM Enterprise Information Portal includes view space 610 with applets 620, 630, 640, and 650. IBM Enterprise Information Portal may support applets in multiple different configurations. For purposes of illustration, applets 620, 630, 640, and 650 are shown in various positions, sizes and arrangements. Specifically, applets 620, 630, and 640 assume a cascade arrangement while applet 650 appears as an independent applet, applet 640 appears as a square, and applet 650 appears as a short rectangle, etc. Thus, the present invention can be utilized in conjunction with the IBM Enterprise Information Portal to present applets in various sizes, positions, and arrangements to a user without changing the size of the view space 610 within the browser screen 600.

Conclusion

This concludes the description of embodiments of the invention. The following describes some alternative embodiments for accomplishing the present invention. For example, any type of computer, such as a mainframe, minicomputer, or personal computer, or computer configuration, such as a time-sharing mainframe, local area network, or standalone personal computer, could be used with the present invention.

The foregoing description of embodiments of the invention has been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. A method of executing applets, comprising:

loading and displaying a main applet;

dynamically selecting a plurality of applets from a displayed list of a plurality of available applets in the displayed main applet, to include in a selection, wherein the plurality of applets displayed in the list are not yet loaded for execution;

sending to a server at substantially the same time, the selection comprising the plurality of applets;

loading the plurality of selected applets into the displayed main applet;

generating a separate window for each loaded applet within the displayed main applet; and displaying and executing each loaded applet in the generated separate window.

2. The method according to claim 1, wherein the main applet is a platform for running any applet.

3. The method according to claim 1, wherein the main applet is a platform for dynamically running independent applets, and wherein each of said windows for the independent applets are resizable.

4. The method according to claim 1, further comprising dynamically loading and removing applets from the main applet, wherein at least two applets of said applets are obtained from different computers and are displayed in a respective window inside the displayed main applet at the same time.

* * * * *